US008754988B2

(12) United States Patent
Baker

(10) Patent No.: US 8,754,988 B2
(45) Date of Patent: Jun. 17, 2014

(54) BLUR DETECTION WITH LOCAL SHARPNESS MAP

(75) Inventor: Daniel G. Baker, Beaverton, OR (US)

(73) Assignee: Tektronix, Inc., Beaverton, OR (US)

(*) Notice: Subject to any disclaimer, the term of this patent is extended or adjusted under 35 U.S.C. 154(b) by 129 days.

(21) Appl. No.: 12/976,729

(22) Filed: Dec. 22, 2010

(65) Prior Publication Data

US 2012/0162527 A1    Jun. 28, 2012

(51) Int. Cl.
*H04N 5/21* (2006.01)
*H04N 5/14* (2006.01)

(52) U.S. Cl.
CPC ... *H04N 5/21* (2013.01); *H04N 5/14* (2013.01)
USPC ..................................... 348/607; 348/E5.062

(58) Field of Classification Search
CPC .................................. H04N 5/14; H04N 5/21
USPC ...................... 348/607, 571, E5.062
See application file for complete search history.

(56) References Cited

U.S. PATENT DOCUMENTS

| 5,999,189 | A  | * | 12/1999 | Kajiya et al. | 382/232 |
|---|---|---|---|---|---|
| 2005/0078884 | A1 | * | 4/2005 | Yi | 382/300 |
| 2007/0184373 | A1 | * | 8/2007 | Mertens | 430/65 |
| 2009/0096882 | A9 | * | 4/2009 | Johnson et al. | 348/222.1 |
| 2009/0147083 | A1 | * | 6/2009 | Pawlicki et al. | 348/119 |
| 2010/0183238 | A1 | * | 7/2010 | Ayzenberg et al. | 382/263 |

FOREIGN PATENT DOCUMENTS

EP  1411469 A2  4/2004
WO  2005/001767 A2  1/2005

OTHER PUBLICATIONS

International Search Report from EP No. 11189901.9, dated Jul. 24, 2013, 6 pages.
Antonio Buemi et al: "Adaptive Sharpening with Overshoot Control," Sep. 8, 2009, Image Analysis and Processing a ICIAP 2009, Springer Berlin Heidelberg, Berlin, Heidelberg, pp. 863-872, XP019128221, ISBN: 978-3-642-04145-7, section 2, figures 2, 3, 4.

* cited by examiner

*Primary Examiner* — Jefferey Harold
*Assistant Examiner* — Justin Sanders
(74) *Attorney, Agent, or Firm* — Michael A. Nelson; Marger Johnson & McCollom PC

(57) ABSTRACT

A single-ended blur detection probe and method with a local sharpness map for analyzing a video image sequence uses two sets of edge filters, one for "fast edges" and the other for "slow edges." Each set of edge filters includes a horizontal bandpass filter, a vertical bandpass filter and a pair of orthogonal diagonal filters where the frequency response of the fast edge filters overlap the frequency response of the slow edge filters. The video image sequence is input to each filter of each set, and the output absolute values are combined with weighting factors to produce a slow edge weighted sum array and a fast edge weighted sum arra. The respective weighted sum arrays are then decimated to produce a slow edge decimated array and a fast edge decimated array. The ratio of the maximum difference value between the decimated arrays and the maximum value from the fast edge decimated array, weighted by an appropriate factor, produces a localized maximum sharpness value, the log of which produces a dimensionless blur value.

20 Claims, 10 Drawing Sheets

BLUR DETECTION WITH LOCAL SHARPNESS MAP

BACKGROUND OF THE INVENTION

The present invention relates to video quality measurements, and more particularly to a single-ended blur detection method to determine overall sharpness of a scene in a video image sequence.

Television broadcasters are interested in determining the quality of a video image sequence that is distributed over Internet Protocol (IP) and radio frequency (RF) broadcast networks. Recently broadcasters have become concerned about the sharpness or, conversely, the blur in video image sequences. There have been customer complaints that some video image sequences look less sharp than others. Such lack of sharpness, or blurring, may be caused by over-compression due to loss of detail resulting from tiling, i.e., coarse pixelation, or de-blocking filters in H.264 compression coders/decoders (CODECs) that remove horizontal and vertical edges which typically further blurs the video image sequence. This may also be caused by up-conversion of the video image sequence, such as from a standard definition (SD) to high definition (HD) video image sequence, where pre-filtering to remove aliasing creates images that have detail below available pixel resolution of the HD video image sequence. Other sources of blurring may include noise reduction or other processing, such as defocus blur typically caused by image processing and motion blur caused by image integration due to linear or non-linear motion during shutter time, that gives an overall impression of a blurry or fuzzy video image sequence.

More and more video delivered by broadcasters is in an HD format. However, a good deal of the programming provided in the HD format originated as SD material that is up-converted. For example, 720×480 or 720×576 interlaced SD material may be up-converted to the higher resolution HD formats, such as 1920×1080 interlaced frame video or 1280×720 progressive frame video. Therefore the up-converted SD video frame content does not provide the detail or sharpness to the full potential of the HD resolution, i.e., the HD video looks soft or blurred. It would be desirable to provide a means for automatically detecting program content in HD that is most likely up-converted SD video.

Prior blur or soft image detection methods are overly sensitive to noise, such that noise within the video images reduces the assigned blur value even though the image still appears soft or blurry. It is desirable to mitigate the sensitivity of blur detection due to noise.

Also, there are many objects within an image, such as foreground and background objects and other features that may or may not be soft or blurry by nature or for artistic reasons. It is desirable to understand what objects within the image are used by any blur detection method in order to determine which objects within the image are used to determine the assessed blur value to support confidence in the assessed blur value.

What is desired is a probe or method that broadcasters may use to assess the blurriness or sharpness of a video image sequence at various distribution points in a distribution network to determine system quality with reasonable confidence.

BRIEF SUMMARY OF THE INVENTION

Accordingly the present invention provides a single-ended blur detection probe and method with a local sharpness map for analyzing a video image sequence. Image sharpness is related to the transition-width or "speed" of edges in the spatial directions that make up the subjective or perceived detail within the image. Two sets of edge filters are used, one for "fast edges" and the other for "slow edges." Each set of edge filters includes a horizontal bandpass filter, a vertical bandpass filter and a pair of orthogonal diagonal filters where the frequency response of the fast edge filters overlap the frequency response of the slow edge filters. The image is input to each filter, and the output absolute values are combined with weighting factors to produce a slow edge weighted sum and a fast edge weighted sum. The respective weighted sums are then decimated to produce a slow edge decimated array and a fast edge decimated array. The ratio of the maximum difference value between the decimated arrays and the maximum value from the fast edge decimated array, weighted by an appropriate factor, produces a localized maximum sharpness value, the negative log of which produces a dimensionless blur value as the reciprocal of sharpness.

The maximum difference value between the decimated arrays, multiplied by another weighting factor, is compared with the difference value between the decimated arrays to produce a sharpness overlay map which is used to mark the original monochrome image or field/frame with a color to indicate areas used to determine the blur value. Also for images having horizontal and vertical blockiness artifacts not in the original image, the horizontal and vertical filters outputs are disabled for blur detection. Alternatively, to detect the blockiness artifacts separate from blur, a set of fast edge filters is used without diagonal filters, and the horizontal and vertical absolute filter outputs are combined and decimated, and the diagonal absolute filter outputs are also combined and decimated. The ratio of the decimated arrays are compared with a threshold to generate a tiling flag when blockiness artifacts occur, which flag may be used to disable the horizontal and vertical filters adaptively for the blur measurement. Finally the local sharpness maximum, or log of the localized maximum sharpness value, may be compared with a sharpness threshold and, if the logLMS value is less than the sharpness threshold for a period of time, an up conversion flag is set to indicate that the image is up-converted from a lower resolution image.

The objects, advantages and other novel features of the present invention are apparent from the following detailed description when read in conjunction with the attached drawing figures and appended claims.

DETAILED DESCRIPTION OF THE INVENTION

Figure 1A:
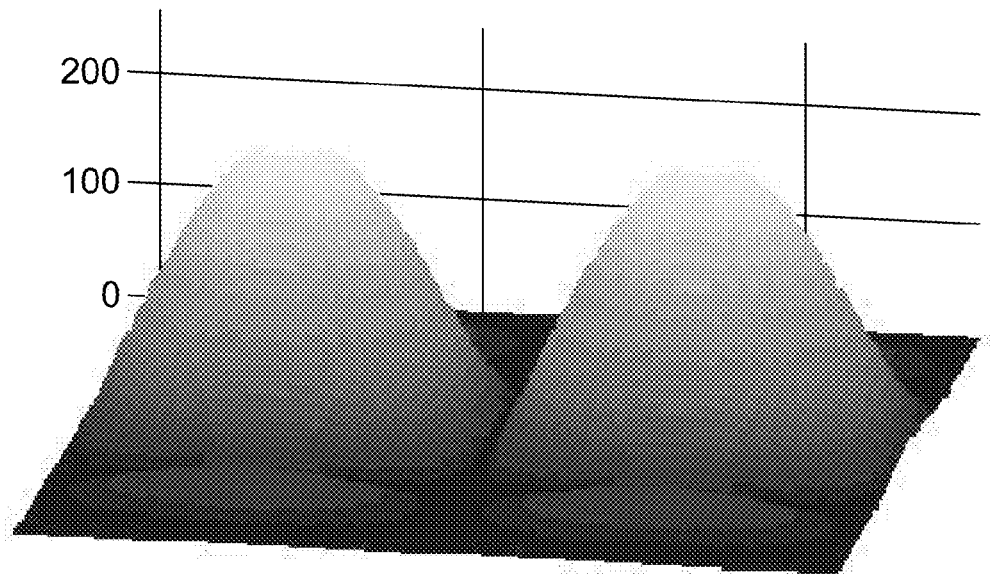
FIGS. 1a and 1b are graphic views of a fast-edge bandpass filter magnitude response as (a) a 3D isometric graph and (b) a 2D intensity graph according to the present invention.

The basic concept used in the present invention is that image sharpness is related to the transition-width or "speed" of edges of objects in the spatial directions which make up the subjective or perceived detail of the image. Blurred or soft images still contain edges defining the image objects, but with relatively longer edge transitions ranging over more pixels in one or more spatial directions. The longer edge transitions may be the result of poor focus, motion-blur during image capture, image compression or noise reduction filtering, or compression de-blocking filtering by HD CODECs. Detection of the edge-widths or edge-speeds of the image objects in a sequence of fields/frames is done in a way to create a normalized ratio of higher spatial frequencies (fast edges=sharp edges) to lower spatial frequencies (slow edges=blurred edges). The assumption is that, for a given image pixel resolution, an image that appears relatively soft or blurred has a lower ratio of high frequencies relative to low frequencies than for the sharpest images in that pixel format. Therefore, a no-reference, blurring value independent of image contrast, size and preferably noise is created that, with proper scaling and weighting, roughly matches a subjective evaluation of the image softness or blurring compared to the full resolution images or image sequence frames at full pixel resolution.

Many times, if not most of the time, images and image sequences may contain fields/frames where only a small portion of the image area is sharp and the rest of the image area is blurred. The blurred portions may be done for artistic reasons or may be due to limitations of camera optics. In these cases it is preferred that the maximum sharpness, or minimum blur, value be used to assess that image field/frame in order to assign a blur value to that image that is more likely related to image processing degradation rather than artistic content. However without a reference image, it is not possible to tell if an image with a high blur value (low sharpness) was degraded in processing, such as image compression, or is an ideal recreation of the original image or field/frame sequence that has soft or blurred content over the entire image area for artistic reasons.

The present invention uses two sets of two-dimensional (2D), bandpass filters (BPFs). A first set is a combination of filters that form "fast-edge processing" detection filters; and a second set is a combination of filters that form "slow-edge processing" detection filters. Each of these two filter sets processes or filters the same image or video field/frame and each is a weighted sum of absolute values of independent horizontal, vertical and diagonal edge filters. These filters are all independently processing the same input image or video field/frame. A selected weighting factor scales each filter output in the summation and may include a zero value weighting to de-select that filter from the output sum.

Each filter in each set is preferably the convolution of the image or video field/frame with a small kernel, such as 5×5 pixels, containing mostly zeroes, ones or twos to eliminate the need for multipliers when implemented in hardware. This minimizes the consumption of valuable hardware logic, as used in field programmable gate arrays (FPGAs).

The "fast-edge" BPF frequency responses of the first set of filters are preferably created to overlap the "slow-edge" BPF frequency responses of the corresponding second set of filters. In this way, for the best range of blur detection, the optimal overlap and filter gain for each set is such that very slow-edges that contain only very low frequency content have the same output response from both sets of filters, i.e., the softer or more blurred the image, the smaller the difference in responses is between corresponding filters in each set.

Figure 1B:
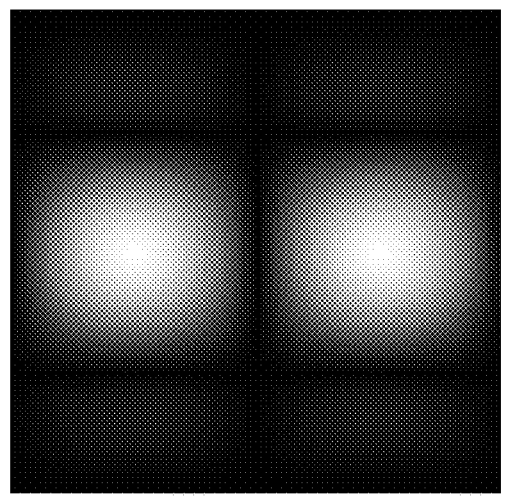

Each filter kernel is chosen to provide fast-edge or slow-edge detection in the selected direction of horizontal, vertical and diagonal image dimensions. However each filter kernel or impulse response is made to be a lowpass frequency in the orthogonal direction to further reduce noise sensitivity while simultaneously providing the prescribed speed edge detection. An example is shown in FIG. 1, where FIG. 1*a* shows a fast-edge horizontal bandpass filter 2D magnitude response as a three-dimensional (3D) isometric graph, and FIG. 1*b* shows the same response as a 2D intensity graph. A zero-frequency or DC value for vertical spatial frequencies lies on a horizontal line in the middle of the graph, since it is showing a double-sided spectrum. Similarly a vertical line in the middle of the graph represents DC response for horizontal spatial frequencies just as a diagonal line through the middle represents DC for diagonal spatial frequencies. As shown in FIG. 1 the horizontal BPF is a lowpass filter (LPF) for vertical spatial frequencies while a BPF with no response at DC for horizontal spatial frequencies.

Figure 2A:
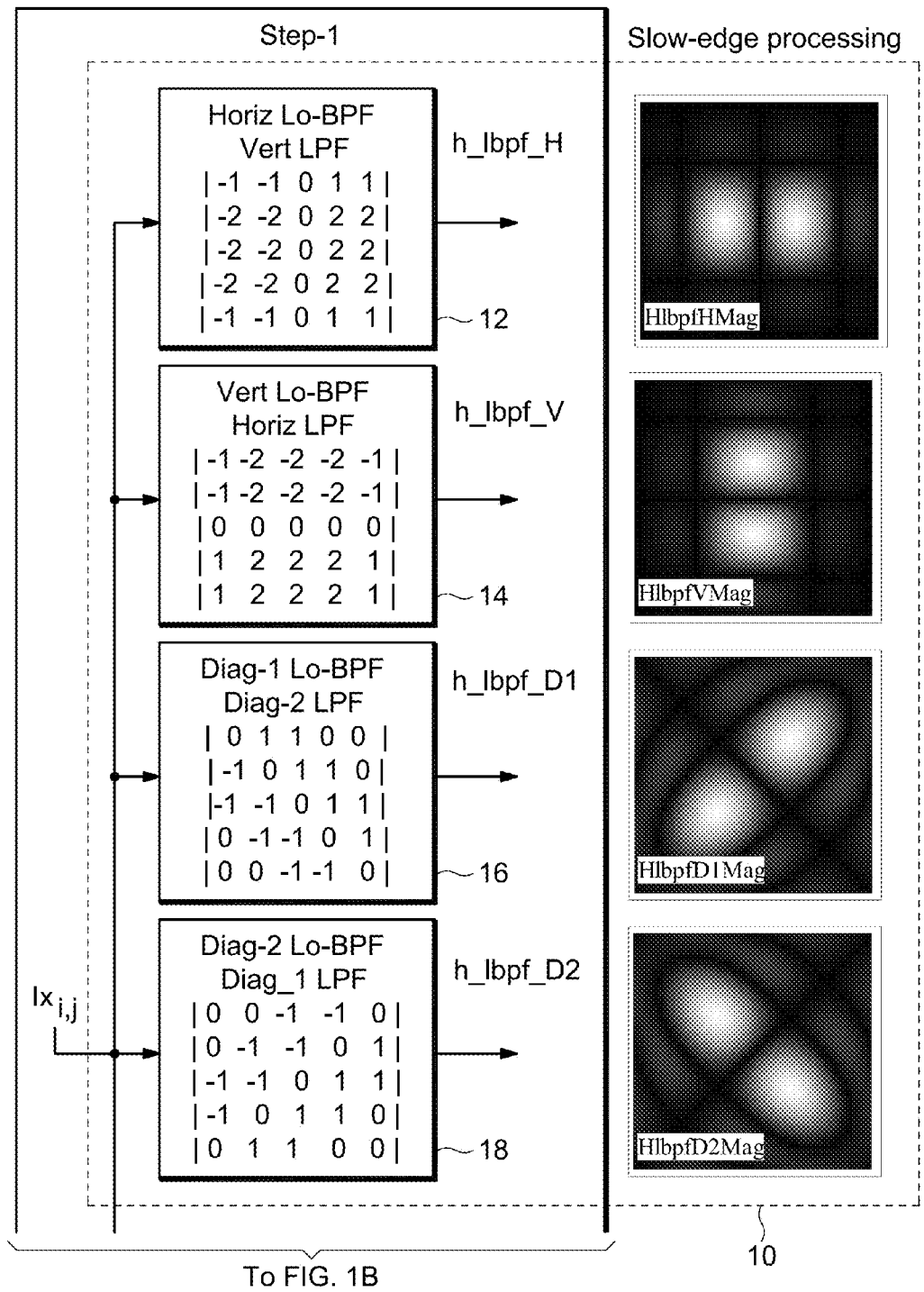
FIG. 2 is a combined block diagram and graphic view of filters used in a blur detection system according to the present invention.
Figure 2B:
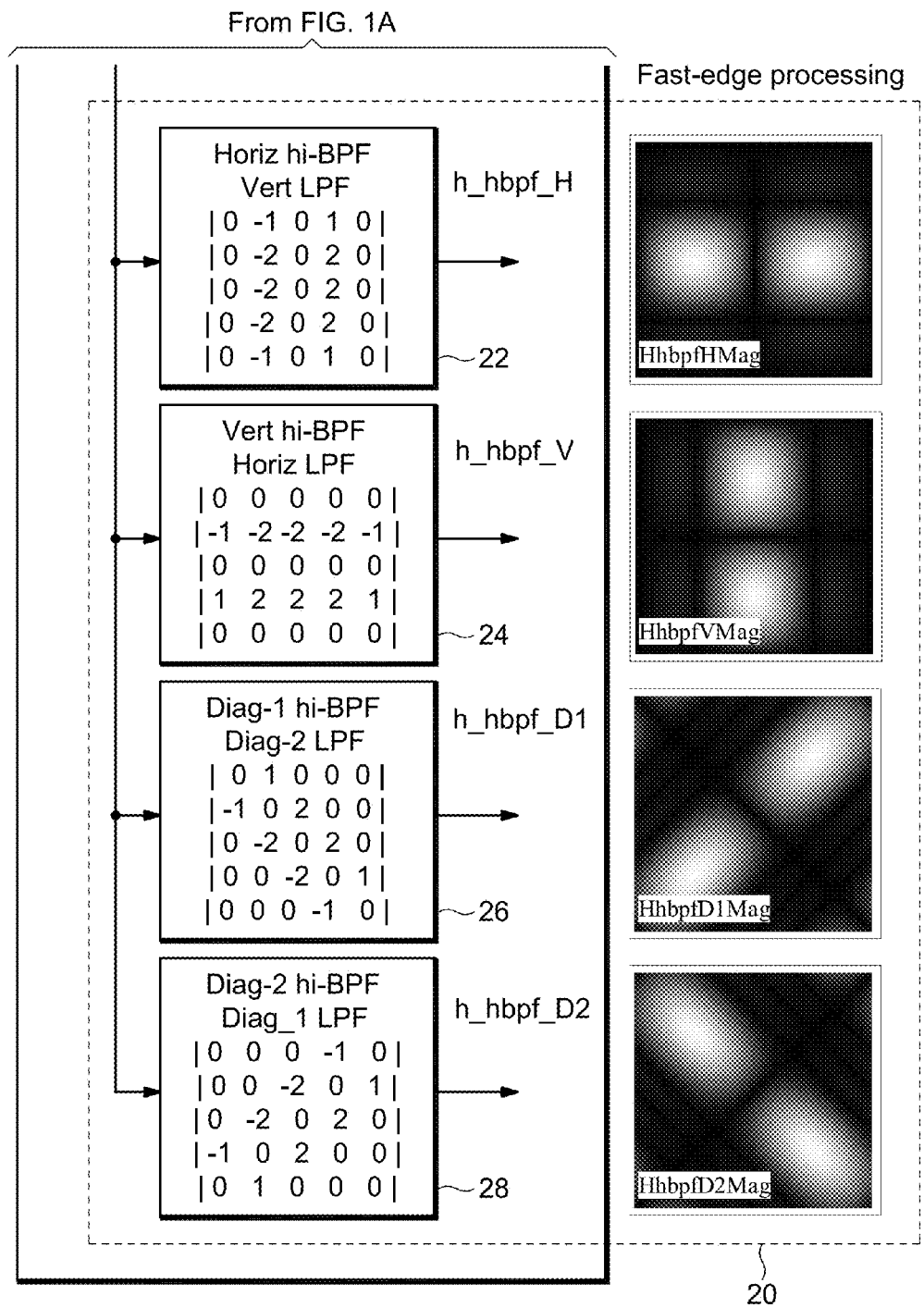

Referring now to FIG. 2, an input signal $Ix_{i,j}$, such as Y, R, G or B field/frames of a video image sequence, are input to a set 10 of slow-edge filters and a set 20 of fast-edge filters. Each set 10, 20 of filters includes a horizontal bandpass/vertical lowpass filter 12, 22, a vertical bandpass/horizontal lowpass filter 14, 24, a first diagonal bandpass/orthogonal lowpass filter 16, 26 and a second diagonal bandpass/orthogonal lowpass filter 18, 28 which is orthogonal to the first diagonal filter. Preferred impulse-response kernel values and the associated spectrum magnitude, as 2D intensity graphs, for each filter 12-18, 22-28 in the two sets 10, 20 are shown adjacent the corresponding filter. For each filter 12-18 in the slow-edge set 10 there is a corresponding filter 22-28 in the fast-edge set 20 with a wider response in the same, bandpass direction and overlapping the slow-edge bandpass magnitude response.

Figure 3A:
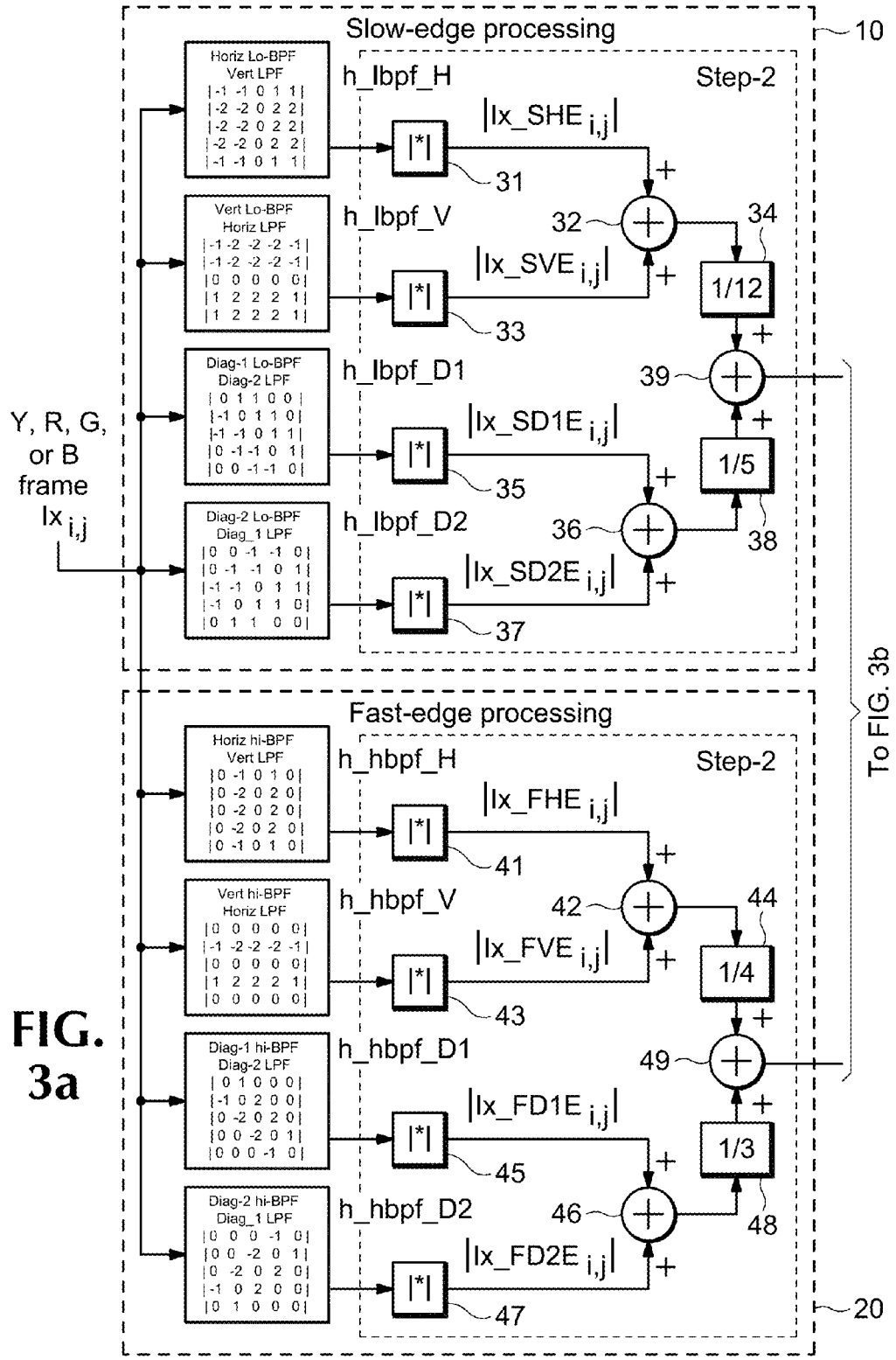
FIG. 3 is a block diagram view of the blur detection system according to the present invention.
Figure 3B:
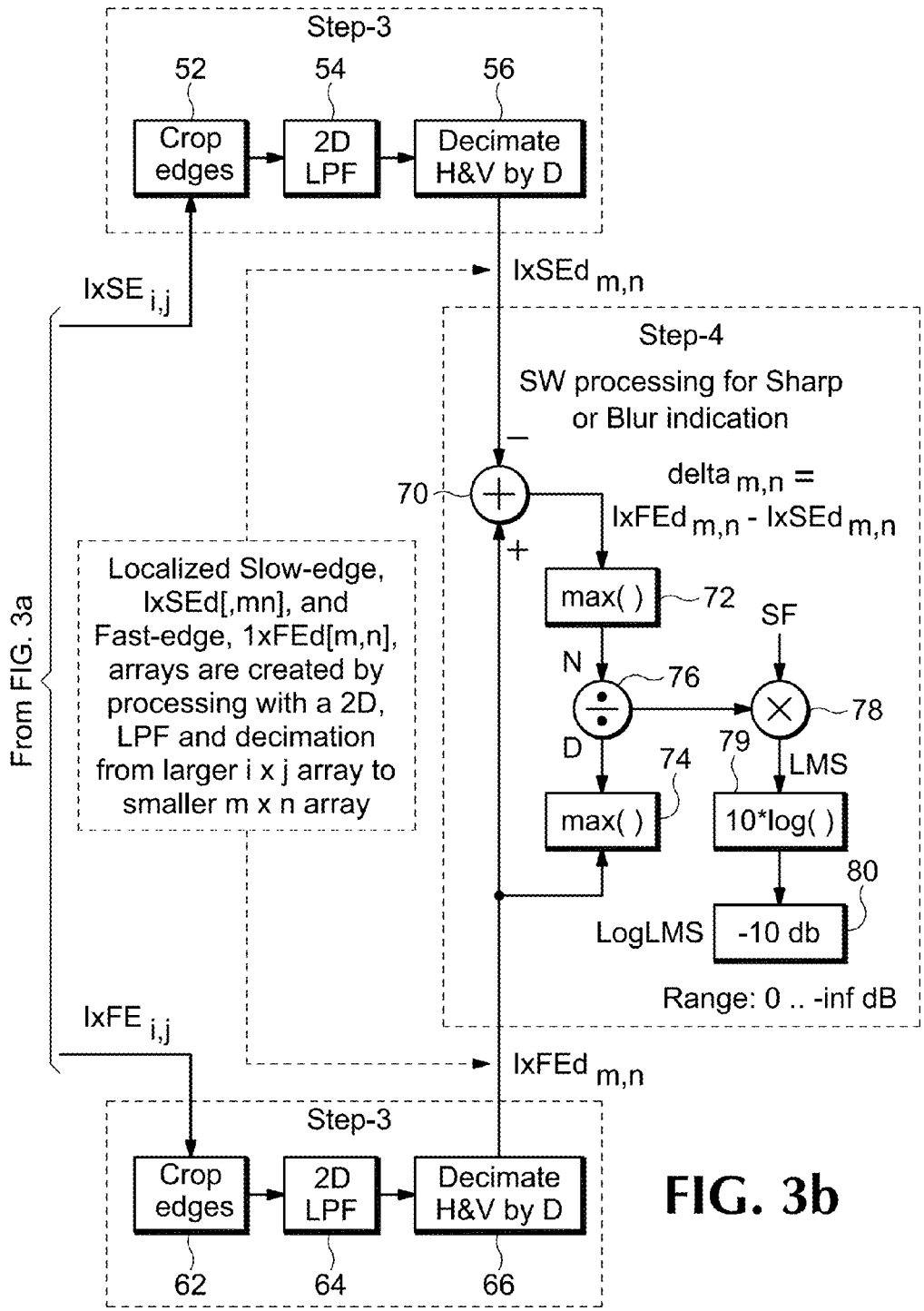

As shown in FIG. 3, the outputs from the filters 12-18, 22-28 are input to respective absolute blocks 31, 33, 35, 37, 41, 43, 45, 47. The resulting absolute values from the filters 12-18, 22-28 are input to respective summation circuits 32, 36, 42, 46 such that the absolute values from the horizontal bandpass filter 12 and vertical bandpass filter 14 of the slow-edge filter set 10 are summed, the absolute values for the diagonal bandpass filters 16, 18 of the slow-edge filter set are summed, the absolute values for the horizontal bandpass filter 22 and vertical bandpass filter 24 of the fast-edge filter set 20 are summed, and the absolute values for the diagonal bandpass filters 26, 28 of the fast-edge filter set are summed. The outputs from the summation circuits 32, 36, 42, 46 are input to respective scaling blocks 34, 38, 44, 48, and then the scaled results are combined in additional summation circuits 39, 49 for each of the filter sets 10, 20 to create the following two arrays:

$$IxSE[i,j]=(|IxSHE[i,j]|+|IxSVE[i,j]|)/12+(|IxSD1E[i,j]|+|IxSD2E[i,j]|)/5;$$

$$IxFE[i,j]=(|IxFHE[i,j]|+|IxFVE[i,j]|)/4+(|IxFD1E[i,j]|+|IxFD2E[i,j]|)/3.$$

The two filtered, weighted sum arrays from the output summation filters 39, 49 of the respective filter sets 10, 20 are each preferably cropped (52, 62) by two pixels on each boundary to remove 2D filtering edge effects on the boundaries. Each weighted sum array is then processed by common or typical 2D LPFs 54, 64 to mitigate aliasing during image size reduction, and then decimated (56, 66) in either the horizontal, vertical or both dimensions into reduced size 2D arrays, IxSEd[m,n] and IxFEd[m,n]. A typical decimation value, D, for both horizontal and vertical decimation is sixteen, reducing the size of each array by a factor of 256. For high pixel density, such as HD video, a decimation value of 32 may be preferred, reducing each array size by 1024. If both horizontal and vertical decimation factors are the same, then both of the ranges m and n are 1/D of the range of i and j.

One of the reduced size arrays, IxSEd[m,n], represents the localized slow-edge mapping and the other, IxFEd[m,n], represents the localized fast-edge mapping of the original image or field/frame. Since these two arrays are decimated to be much smaller than the original image or field/frame, they typically are small enough to allow software processing without the need for high speed software or hardware.

The decimated arrays are then processed, preferably by a software application, to detect log-weighted localized maximum sharpness (LMS). Delta[m,n] is the output of a difference block 70 into which the decimated arrays are input. The output from the difference block 70 is input to a maximum value block 72 and the fast edge decimated array is input to another maximum value block 74. The maximum values are then input to a divider 76 and multiplied (78) by a scale factor, SF, for setting the 0 dB or unity LMS value. The result is the LMS value which is then input to a logarithmic block 79 to produce the LMS output 80 as a dimensionless value in the range from 0 to infinite dB. The results are shown in equation form as follows:

$$delta[m,n]=IxFEd[m,n]-IxSEd[m,n];$$

$$LMS=SF*\max(delta[m,n])/\max(IxFEd[m,n]);$$

$$LogLMS=10*\log(LMS), \text{ in dB}.$$

This LogLMS calculation returns negative values and ranges from 0<->-inf dB, indicating increasing degradation in sharpness as a function of more negative values. To indicate increases in blur as increasingly larger positive values, the sign may simply be removed, making a localized blur metric the inverse (negative log) of the LMS.

Although LogLMS provides a dimensionless value in dB, the scaling of log(LMS) by a value other than 10 may be useful to create more meaningful numeric values for indicating sharpness or blur over a preferred range which have a better correlation to subjective assessment.

Also the maximum fast-edge value, max(IxFEd[m,n]), may be compared to a predetermined threshold so that, if it never exceeds that threshold, the image is determined to have so little detail as to preclude the need to compute a blur value. In this case the LMS value for that image may be flagged as invalid or ignored.

Figure 4A:
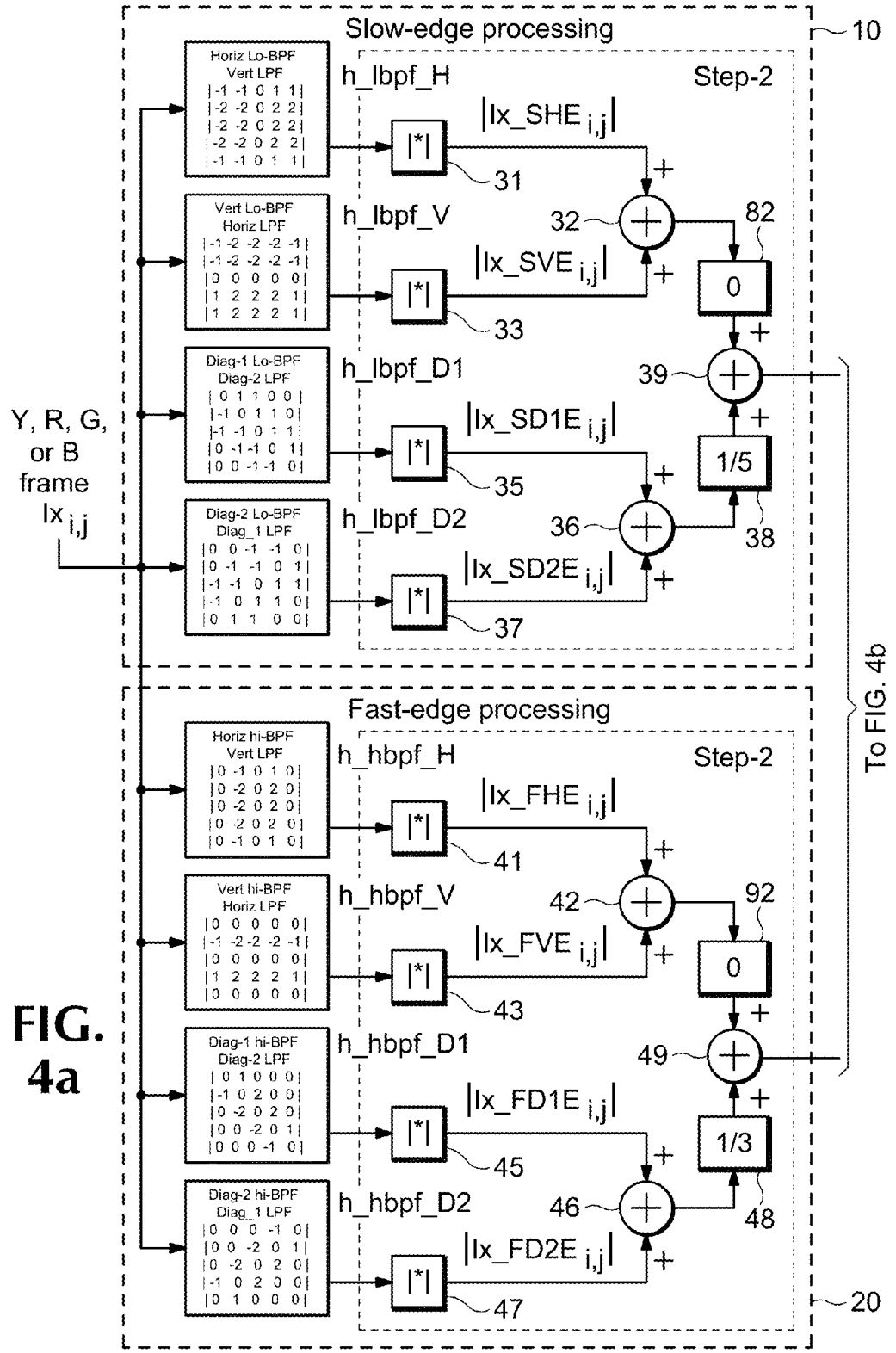
FIG. 4 is a block diagram view of another embodiment of the blur detection system according to the present invention.
Figure 4B:
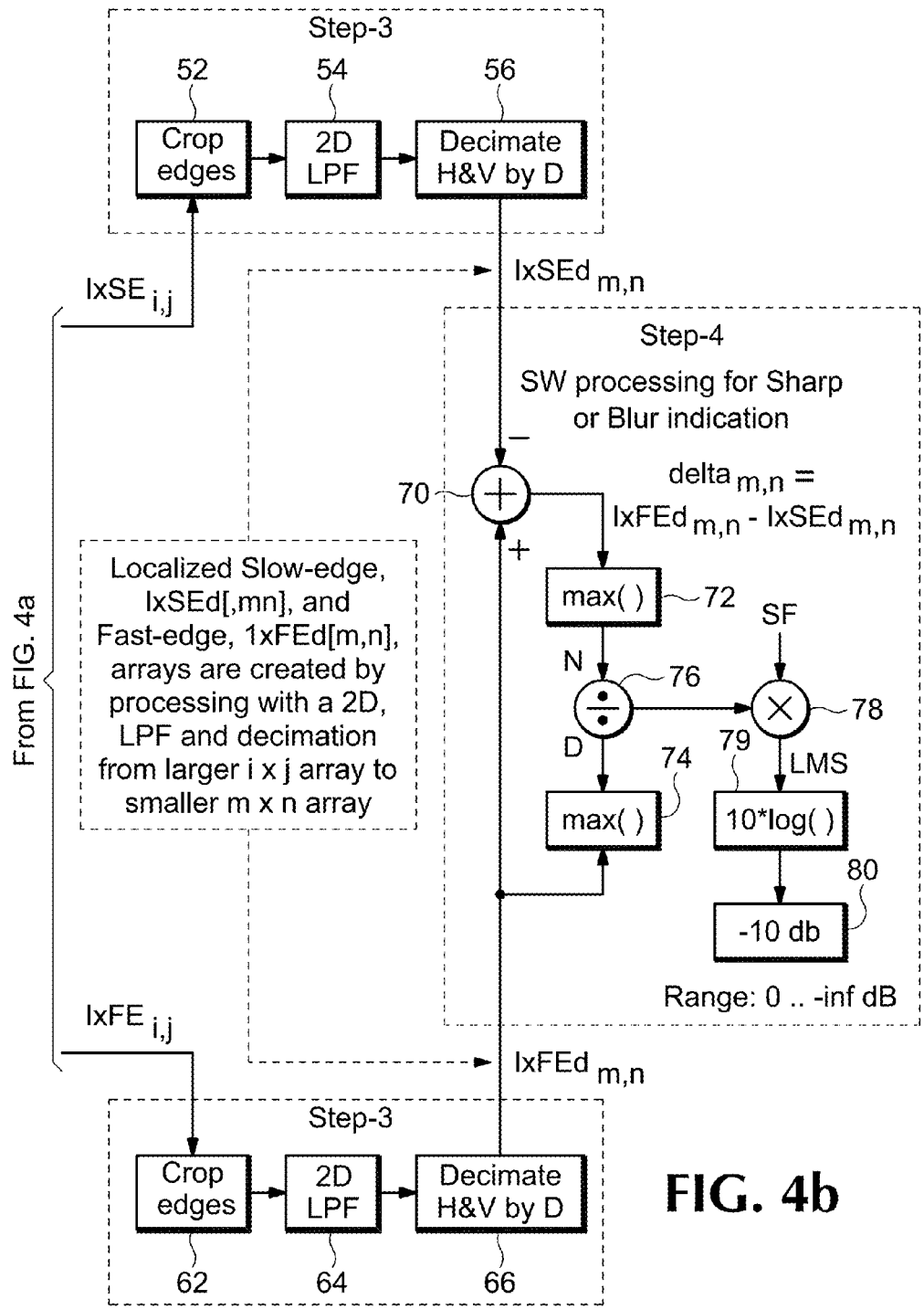

A problem with detecting loss of sharpness on compressed video frames is that tiling or blockiness created by over-compression causes a loss in perceived detail, even though in fact it creates sharp horizontal and vertically aligned edges on DCT block boundaries. Also interlaced video frames of motion sequences may contain substantially horizontally aligned edges, sometimes called "jaggy or zipper effect", even though the image appears soft or blurred. To avoid this problem, LMS detection is performed only on diagonally aligned edges, as shown in FIG. 4, setting the summed outputs of the horizontal and vertical filters to zero (82, 92). This substantially reduces the over-estimation of sharpness on over-compressed frames that have horizontal and vertically aligned sharp edges due to tiling or blockiness, but the frames have a perceived loss of sharpness typically looking soft or blurred. Also letter-box video may have sharp horizontal and vertical edges that should not be part of the sharpness determination. The resulting equations become:

$$IxSE[i,j]=(|IxSD1E[I,j]|+|IxSD2E[I,j]|)/5;$$

$$IxFE[I,j]=(|IxFD1E[I,j]|+|IxFD2E[I,j]|)/3.$$

Figure 5:
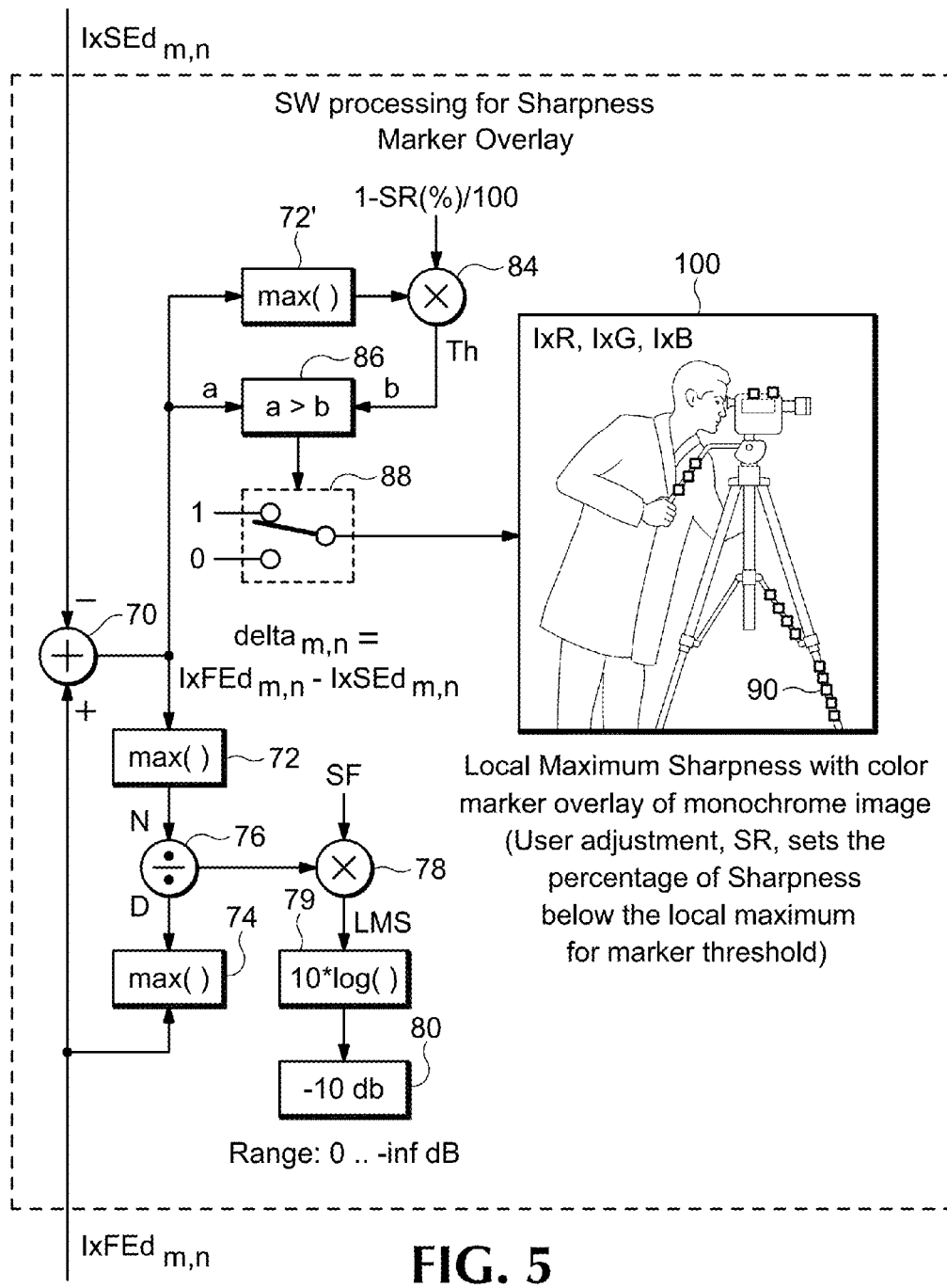
FIG. 5 is a block diagram view of a portion of the blur detection system for producing sharpness overlay maps according to the present invention.

A sharpness map overlay, SMap[m,n], may be provided that indicates on each image or field/frame, with a valid computed LMS or LogLMS value, a localized region exceeding a preset sharpness threshold, Th, as shown in FIG. 5. The max(delta[m,n,]) (72') is input to a multiplier 84 where it is multiplied by a constant 1−SR(%)/100 to produce a threshold value, Th. The threshold value is compared in a comparator 86 with delta[m,n,] and, if delta[m,n] is greater than the threshold, a switch 88 is switched to produce a "1" output, otherwise the switch produces a "0" output. The equations for the above are as follows:

$$Th=(1-SR/100)*\max(delta[m,n]), \text{ where } SR=\text{user defined value } 0<->100\%;$$

$$SMap[m,n]=\text{if}(delta[m,n]>Th,1,0).$$

The sharpness map is up-sized to the original image dimensions to overlay the image 100 with those blocks that have a non-zero value for SMap[m,n]. This acts as a marker key 90 over a monochrome or luminance component of the image or field/frames to provide a colored or otherwise visible marker for those image areas that are above the threshold. This provides marking of the detected sharpest image regions by placing a colored marker 100 over the corresponding pixels of the monochrome image where the sharpness map values are non-zero. The resulting marked image or video frame sequence provides a realtime feedback to a user as to where in the image the LMS detection is seeing the sharpest edges and all edges that are SR percent less sharp.

Figure 6:
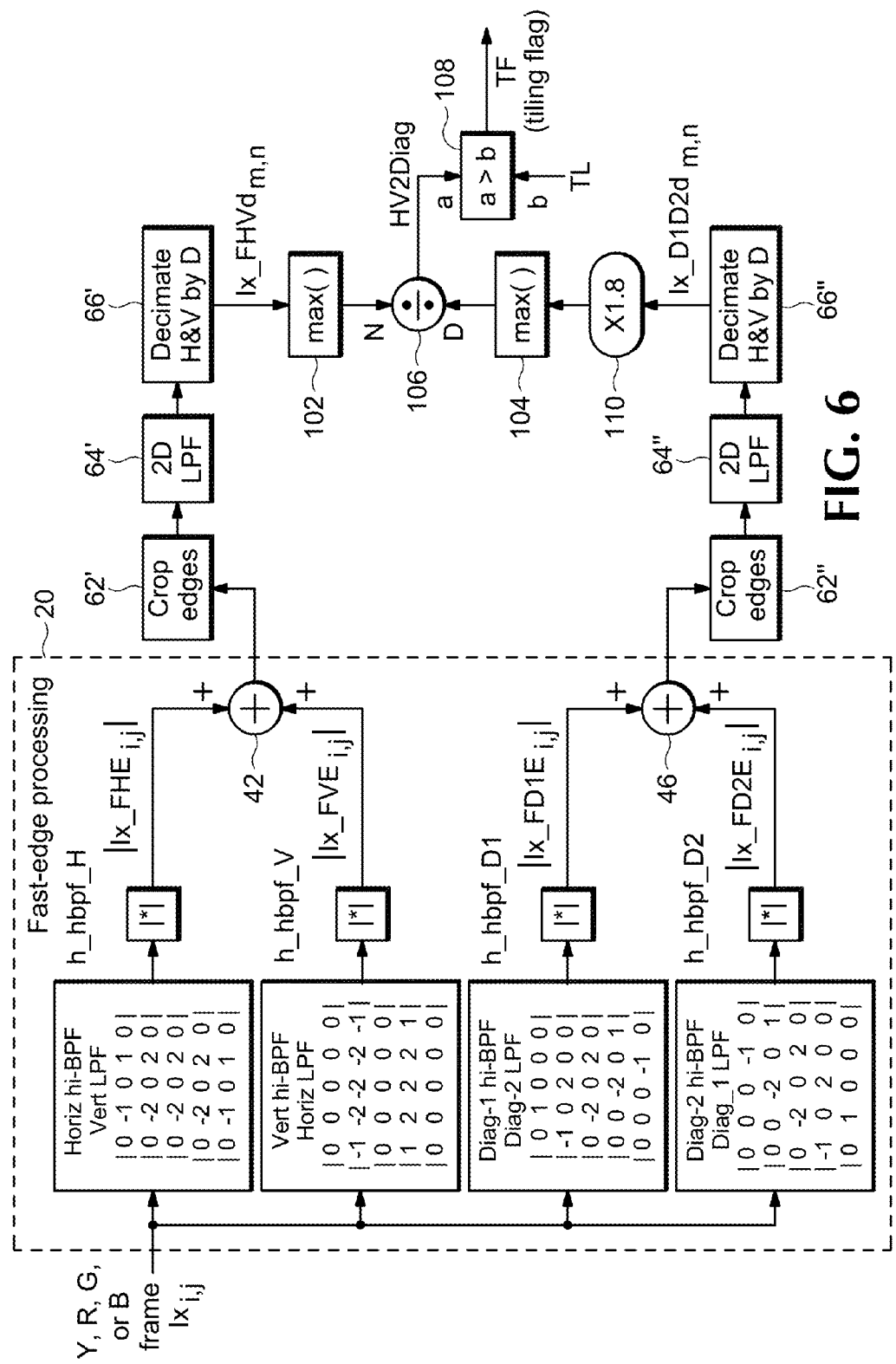
FIG. 6 is a block diagram view of a portion of the blur detection system for detecting tiling according to the present invention.

In order to provide an indication that the image may contain excessive tiling or blockiness due to over-compression of the image or video frame sequence, the ratio (106) of the maximum outputs (102, 104) from the localized, decimated fast-edge horizontal and vertical filters 66' to the localized, decimated fast-edge diagonal filters 66'' is taken, as shown in FIG. 6. The output from the decimated fast-edge diagonal filters 66'' is multiplied (110) by a constant prior to having the maximum output (104) determined. The following equations embody what is shown in FIG. 6:

$$HV2Diag=\max(Ix\_FHVd[m,n])/(1.8*\max(Ix\_D1D2d[m,n]))$$

$$\text{If}(HV2Diag>TL) \text{ then } TF=1, \text{ else } TF=0$$

The computed ratio, HV2Diag, is typically near unity. However an excess of horizontal and vertical edges relative to the diagonal is detected when the ratio exceeds a predetermined tiling threshold level, TL, as determined by a comparator 108, setting a tiling flag, TF, to indicate the image may have excessive tiling. A typical setting for TL is 1.1. The resulting tiling flag, TF, may be used to indicate the over-compression case in order to turn off the horizontal and vertical filters by setting the weighting factor to zero (82, 92) to allow only diagonal processing, as discussed above with respect to FIG. 4.

Figure 7:
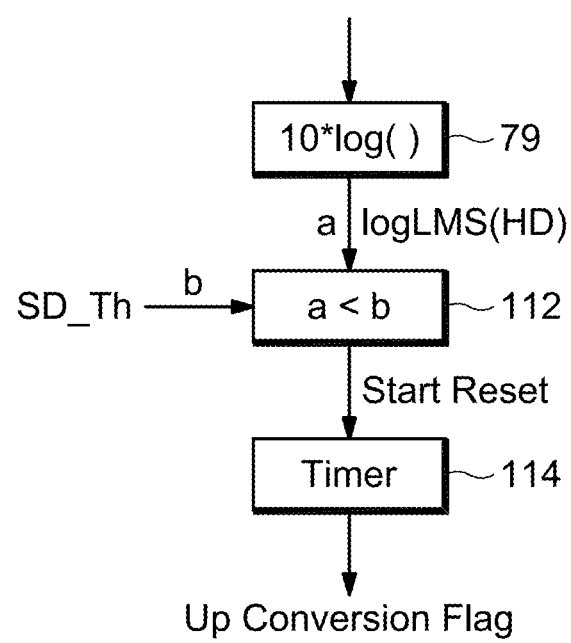
FIG. 7 is a block diagram view of a portion of the blur detection system for detecting upconversion according to the present invention.

When the image or video frame sequence is presented in an HD or relatively high resolution format, LogLMS is compared (112), as shown in FIG. 7, to a predetermined threshold, SD_Th, to determine if the image or frame sequence is consistently below this threshold. If LogLMS remains below this threshold for long durations as determined by a timer 114, such as several minutes, the program content is indicated or flagged via an UpConversionFlag as upconverted from a lower definition content. A typical value for SD_Th for HD video in the formats of 1920×1080 and 1280×720 has been determined empirically to be −3.

The output values, LogLMS in dB, Sharpness Map overlay, Tiling Flag and UpConversionFlag, may be presented to a software User Interface (UI) that analyzes the luminance or RGB content of images, decompressed video files, decompressed streaming video over the internet, or uncompressed baseband video.

Thus the present invention provides a probe and method that filters an image or video frame sequence horizontally, vertically and diagonally using corresponding sets of fast-edge BPFs and slow-edge BPFs to calculate a weighted sum for each set, which sums are decimated and processed to determine a localized maximum sharpness (LMS) value in dB.

The invention claimed is:

1. A probe for determining image blurriness comprising:
    a first set of edge filters configured to detect fast edges within an input image to produce a plurality of fast edge filter outputs;
    a second set of edge filters configured to detect slow edges within the input image to produce a plurality of slow edge filter outputs;
    a first summation circuit configured to combine the fast edge filter outputs to produce a fast edge filter output array;
    a second summation circuit configured to combine the slow edge filter outputs to produce a slow edge filter output array;
    circuitry configured to decimate the fast edge and the slow edge filter output arrays separately to produce a decimated fast edge filter array and a decimated slow edge filter array; and
    circuitry configured to process the respective decimated fast edge and slow edge filter arrays to generate a localized maximum sharpness value as a measure of the blurriness of the input image.

2. The probe as recited in claim 1 wherein the first and second sets of edge filters each comprise:
    a horizontal edge filter having the input image as an input and producing a horizontal filter output;
    a vertical edge filter having the input image as an input and producing a vertical filter output;
    a first diagonal edge filter having the input image as an input and producing a first diagonal filter output; and
    a second diagonal edge filter orthogonal to the first diagonal edge filter having the input image as an input and producing a second diagonal filter output.

3. The probe as recited in claim 2 wherein each edge filter comprises a filter having a bandpass characteristic along a principal direction and a lowpass filter characteristic along an orthogonal direction to the principal direction, bandpass frequencies for the first set of edge filters overlapping bandpass frequencies for the second set of edge filters.

4. The probe as recited in claim 3 wherein each edge filter comprises a filter having a filter kernel of 0s, 1s and 2s that define the bandpass characteristic along the principal direction and the lowpass filter characteristic along the orthogonal direction.

5. The probe as recited in claim 2 wherein the first and second summation circuits each comprise:
    a first summation block configured to combine the horizontal edge filter output with the vertical edge filter output to produce a first edge filter summation output;
    a second summation block configured to combine the first diagonal edge filter output with the second diagonal edge filter output to produce a second edge filter summation output;
    circuitry configured to weight each of the first and second edge filter summation outputs to produce respective weighted sum edge filter outputs; and
    a third summation block configured to combine the respective weighted sum edge filter outputs to produce the fast edge and slow edge filter arrays respectively.

6. The probe as recited in claim 1 wherein the decimating circuitry comprises:
    a lowpass filter for each of the fast edge and slow edge filter arrays having the respective edge filter array as an input to produce respective filtered edge filter arrays; and
    a decimator configured to decimate each of the filtered edge filter arrays to produce the respective decimated edge filter arrays.

7. The probe as recited in claim 6 wherein the decimating circuitry further comprises a crop block configured to crop the edges of the respective fast edge and slow edge filter arrays prior to input to the respective lowpass filters.

8. The probe as recited in claim 1 wherein the processing circuitry comprises:
    a difference block configured to combine the decimated fast edge and decimated slow edge filter arrays to produce a difference filter array;
    circuitry configured to generate a ratio between the difference filter array and the decimated fast edge filter array to produce the localized maximized sharpness value.

9. The probe as recited in claim 8 wherein the ratio generating circuitry comprises:
    a first maximum value block configured to obtain a maximum of the decimated fast edge filter array and a second maximum value block configured to obtain a maximum of the difference filter array; and
    a divider configured to divide the maximum of the difference filter array by the maximum of the fast edge filter array to produce the localized maximized sharpness value.

10. The probe as recited in claim 9 wherein the ratio generating circuitry further comprises a multiplier configured to multiply the output from the divider by a sharpness factor to produce the localized maximized sharpness value.

11. The probe as recited in claim 10 wherein the ratio generating circuitry further comprises a logarithmic block configured to obtain the log of the output from the multiplier to produce the localized maximized sharpness value as a dimensionless value.

12. The probe as recited in claim 2 further comprising circuitry configured to disable the horizontal and vertical edge filter outputs of each of the first and second sets of edge filters so the edge filter outputs from the first and second sets of edge filters reflect only the filter outputs from respective diagonal edge filter pairs.

13. The probe as recited in claim 1 wherein the processing circuitry comprises:
    a difference block having as inputs the fast edge and slow edge decimated filter output arrays to produce a difference filter output array;
    circuitry configured to generate from the difference filter array and a sharpness ratio localized markers configured to superimpose on the input image to indicate where the sharpest edges occur within the input image.

14. The probe as recited in claim 13 wherein the generating circuitry comprises:
   a threshold generator having the difference filter output array and a sharpness ratio as inputs and producing a threshold value as an output;
   a comparator having the difference filter output array and the threshold value as inputs and producing the localized markers as output when the difference filter output array exceeds the threshold value.

15. The probe as recited in claim 2 further comprising:
   a third summation circuit configured to combine the horizontal and vertical edge filter outputs for the first set of edge filters to produce a first fast edge filter output array;
   a fourth summation circuit configured to combine the first and second diagonal edge filter outputs for the first set of edge filters to produce a second fast edge filter output array;
   circuitry configured to decimate the first and second fast edge filter output arrays to produce decimated first and second fast edge filter output arrays; and
   a combination block configured to compare a ratio of the first and second fast edge filters with a tiling threshold to produce a tiling flag indicative of block artifacts within the input image.

16. The probe as recited in claim 15 further comprising circuitry configured to disable the horizontal and vertical edge filter outputs of each of the first and second sets of edge filters in response to the tiling flag so the edge filter outputs from the first and second sets of edge filters reflect only the filter outputs from respective diagonal edge filter pairs.

17. The probe as recited in claim 1 further comprising:
   a comparison block configured to compare the localized maximum sharpness value with a sharpness threshold; and
   circuitry configured to generate an up conversion flag when the sharpness threshold is less than the localized maximum sharpness value for a predetermined period of time, indicating the input image was upconverted from a lower resolution image.

18. A method of determining image blurriness comprising the steps of:
   filtering an input image with a first set of edge filters configured to detect fast edges in the input image to produce a plurality of fast edge filter outputs;
   filtering the input image with a second set of edge filters configured to detect slow edges in the input image to produce a plurality of slow edge filter outputs;
   combining the fast edge filter outputs to produce a fast edge filter output array by way of a first summation circuit;
   combining the slow edge filter outputs to produce a slow edge filter output array by way of a second summation circuit;
   decimating the fast edge and the slow edge filter output arrays separately to produce a decimated fast edge filter array and a decimated slow edge filter array; and
   processing the respective decimated fast edge and slow edge filter arrays to generate a localized maximum sharpness value as a measure of the blurriness of the input image.

19. The method as recited in claim 18 further comprising the steps of:
   obtaining a difference between the fast edge and slow edge decimated filter output arrays to produce a difference filter output array;
   generating from the difference filter output array and a sharpness ratio localized markers for superimposing on the input image to indicate where the sharpest edges occur within the input image.

20. The method as recited in claim 18 further comprising the steps of:
   combining horizontal and vertical edge filter outputs for the first set of edge filters to produce a first fast edge filter output array;
   combining first and second diagonal edge filter outputs for the first set of edge filters to produce a second fast edge filter output array;
   decimating the first and second fast edge filter output arrays to produce decimated first and second fast edge filter output arrays; and
   comparing a ratio of the first and second fast edge filters with a tiling threshold to produce a tiling flag indicative of block artifacts within the input image.

* * * * *